US008290903B2

(12) United States Patent
Gulin et al.

(10) Patent No.: US 8,290,903 B2
(45) Date of Patent: Oct. 16, 2012

(54) UPDATING A PORTABLE COMMUNICATION DEVICE WITH MEDIA FILES

(75) Inventors: Jens Gulin, Lund (SE); Per Hyttfors, Lund (SE); Karl Soderstrom, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1529 days.

(21) Appl. No.: 11/243,284

(22) Filed: Oct. 4, 2005

(65) Prior Publication Data

US 2007/0078899 A1 Apr. 5, 2007

(51) Int. Cl.
G06F 17/00 (2006.01)
(52) U.S. Cl. .................... 707/621; 707/620; 707/638
(58) Field of Classification Search .................. 707/200, 707/100, 104.1, 620, 621, 638; 455/400, 455/502; 709/219
See application file for complete search history.

(56) References Cited

U.S. PATENT DOCUMENTS

| | | | |
|---|---|---|---|
| 6,356,951 B1 * | 3/2002 | Gentry, Jr. ..................... | 709/250 |
| 6,816,944 B2 * | 11/2004 | Peng .............................. | 711/133 |
| 7,024,214 B2 * | 4/2006 | Loveland ....................... | 455/502 |
| 7,512,607 B2 | 3/2009 | Nagano et al. | |
| 2001/0052052 A1 | 12/2001 | Peng | |
| 2004/0064446 A1 | 4/2004 | Fujimura | |
| 2005/0021470 A1 | 1/2005 | Martin et al. .................... | 705/51 |
| 2005/0075134 A1 * | 4/2005 | Steenstra et al. ............... | 455/557 |
| 2005/0252958 A1 * | 11/2005 | Lee ................................ | 235/375 |
| 2006/0111083 A1 * | 5/2006 | Goss .......................... | 455/412.1 |
| 2006/0154676 A1 * | 7/2006 | Kraft et al. ..................... | 455/466 |
| 2006/0168323 A1 * | 7/2006 | Kim et al. ...................... | 709/238 |
| 2007/0056013 A1 * | 3/2007 | Duncan ......................... | 725/134 |

FOREIGN PATENT DOCUMENTS

| | | |
|---|---|---|
| EP | 1154631 A2 * | 11/2001 |
| EP | 1 338 968 A2 | 8/2003 |
| EP | 1 530 113 | 5/2005 |
| JP | 2001-358799 | 12/2001 |
| JP | 2002-366569 | 12/2002 |
| JP | 2004-046497 | 2/2004 |
| JP | 2004-118332 | 4/2004 |
| JP | 2004-118729 | 4/2004 |
| JP | 2005-141635 | 6/2005 |
| WO | 03/007162 A1 | 1/2003 |
| WO | 2005/069651 A2 | 7/2005 |

OTHER PUBLICATIONS

International Search Report and Written Opinion for PCT/EP2006/066956; Date of mailing Jan. 30, 2007.

* cited by examiner

Primary Examiner — Rehana Perveen
Assistant Examiner — Tiffany Thuy Bui
(74) Attorney, Agent, or Firm — Myers Bigel Sibley & Sajovec, P.A.

(57) ABSTRACT

Embodiments of the invention are directed to a system for updating a portable communication device from a media file server. The device automatically orders updating of the media files in a file storage based on detecting the processing of a number of media files and types of possible wireless connections between device and server. In doing this the device removes processed media files, determines an updating volume based on the available storage space in the file storage, requests a transfer of new media files from the server to the device, receives new media files replacing removed media files and stores them in the file storage. The server has a media file archive comprising a number of media files and an archive control unit, which receives the request for transfer, selects new media files that fit into the updating volume and sends them to the device.

35 Claims, 3 Drawing Sheets

UPDATING A PORTABLE COMMUNICATION DEVICE WITH MEDIA FILES

FIELD OF THE INVENTION

The present invention relates to the field of portable communication devices. More particularly the present invention relates to a method of updating a portable communication device, a portable communication device, a media file server and computer program products for updating a portable communication device with media files.

BACKGROUND

Portable media players have in recent years become more and more popular. With these devices it is possible to store a large amount of media files for a user and play these. By connecting such a player to a computer it is possible to remove media files and replace them with new media files. However, this is normally quite a burdensome and tedious operation for a user.

US2005/0021470 describes a system where a portable media player can be connected to a host. The media files or works stored in the player can here be updated. The document describes that updating of the works in the player is made based on preference scores that are either supplied by a user or determined based on user actions and play sequences. Therefore a swapping out process is provided which swaps low preference media works for higher preference media works. In this way the swapping increases the chance of pleasing the user despite the fact that the device has a limited storage capacity. Downloading of works is also being described as performed by a background process so that a user is not aware that the downloading occurs.

It is of interest to provide a media player in a cellular phone. However a phone often has a lot of extra functionality, requiring storage space, which means that the storage space left over for media files is often more limited than in a dedicated media player having only media playing functionality.

Because of this a media player provided in a cellular phone will have access to a limited number of media files. It is therefore of interest to provide an enhanced way of changing media files for a media player that allows a user to access a large amount of media files without having to be involved in the actual transfer.

SUMMARY OF THE INVENTION

Various embodiments of the present invention are directed towards providing an enhanced way of changing media files in a portable communication device that allows a user to access a large amount of media files without having to be involved in the actual transfer.

Some embodiments of the present invention provide a method that provides an enhanced way of changing media files in a portable communication device that allows a user to access a large amount of media files without having to be involved in the actual transfer.

According to a first embodiment of the present invention, a method of updating a portable communication device from a media file server includes the steps of:
  determining a first updating circumstance through detecting that a number of media files provided in a limited size media file storage of the portable communication device have been processed,
  determining at least one further updating circumstance through determining the different types of wireless connections that can be set up between the portable communication device and the media file archive,
  automatically performing updating, at least in dependence of said detecting a number of media files having been processed and the types of wireless connections that can be set up to the media file server, possibly together with other further updating circumstances, through
    removing processed media files from the limited size file storage,
    determining the available storage space for media files in the file storage after the step of removing,
    determining an updating volume based on said available storage space,
    requesting, via a wireless connection to the media file server, a transfer of new media files from the media file server to the file storage to be fit into the updating volume,
    receiving new media files through the wireless connection replacing at least some removed media files, and
    storing the received media files in the media file storage.

A second embodiment of the present invention includes the steps of the first embodiment, wherein one type of wireless connection is a local wireless connection between the portable communication device and the media file archive and the automatic updating is performed in dependence of the existence of a local wireless connection.

A third embodiment of the present invention includes the steps of the second embodiment, wherein the automatic updating is performed if a number of media files have been processed and a local wireless connection exists.

A fourth embodiment of the present invention includes the steps of the second embodiment, wherein the automatic updating is performed based on another further updating circumstance if a number of media files have been processed and no local wireless connection exists.

A fifth embodiment of the present invention includes the steps of the first embodiment, wherein one further updating circumstance is that the number of non-processed files in the storage falls below a threshold.

A sixth embodiment of the present invention includes the steps of the first embodiment, wherein one further updating circumstance is that a certain point in time has been reached.

A seventh embodiment of the present invention includes the steps of the sixth embodiment, wherein the point in time is a relative point in time that depends on the latest previous update.

An eighth embodiment of the present invention includes the features of the first embodiment, wherein the point in time is a fixed point in time.

A ninth embodiment of the present invention includes the features of the sixth embodiment, wherein one further updating circumstance is that a calendar setting has been made in the portable communication device.

A tenth embodiment of the present invention includes the features of the first embodiment, wherein one further updating circumstance is that the portable communication device is physically connected to another device.

An eleventh embodiment of the present invention includes the features of the first embodiment, wherein a user of the portable communication device has a set of different selectable media profiles and further comprising the steps of selecting a media profile based on at least one of said further updating circumstances and providing information of the selected media profile to the media file server in order to enable reception of new media files according to said selected media profile, whereby said further updating circumstance used for selecting a media profile need not be used for determining automatic performing of updating.

A twelfth embodiment of the present invention includes the features of the eleventh embodiment, wherein the step of removing processed media files includes removing media files in dependence of the selected media profile A thirteenth embodiment of the present invention includes the features of the first embodiment, further including the step of selecting new media files in the media file server that are to be fit into the updating volume and sending these files to the portable communication device.

A fourteenth embodiment of the present invention includes the features of the thirteenth embodiment, further comprising the step of changing coding of at least one new media file.

A fifteenth embodiment of the present invention includes the features of the fourteenth embodiment, wherein the coding is changed based on the quality of the wireless link between the portable device and the network.

A sixteenth embodiment of the present invention includes the features of the fourteenth embodiment, wherein the coding is changed in order to fit the new files to the updating volume.

A seventeenth embodiment of the present invention includes the features of the first embodiment, wherein the media file storage includes at least one media file not present in the media file server, the step of removing includes removing at least one such media file not present in the media file server and further comprising the step of transferring said removed media file to the media file server.

An eighteenth embodiment of the present invention includes the features of the seventeenth embodiment, wherein the selection of which such media files not present in the media file server that are removed and transferred is based on at least one further updating circumstance.

A nineteenth embodiment of the present invention includes the features of the first embodiment, wherein the updating volume is decided also based on one further updating circumstance.

Another embodiment of the present invention is directed towards providing a portable communication device that provides an enhanced way of changing media files in a portable communication device that allows a user to access a large amount of media files without having to be involved in the actual transfer.

According to a twentieth embodiment of the present invention, a portable communication device for updating of media files from a media file server includes:
  at least one radio communication unit,
  a limited size media file storage,
  a media processing unit arranged to process at least one media file in said file storage, and
  a control unit arranged to
    determine a first updating circumstance through detecting that a number of media files provided in the limited size media file storage have been processed,
    determine at least one further updating circumstance through determining the different types of wireless connections that can be set up between the portable communication device and the media file server, and
    automatically order updating, at least in dependence of said detecting a number of media files having been processed and the types of wireless connections that can be set up to the media file server, possibly together with other further updating circumstances, through removing processed media files from the limited size file storage,
    determining an updating volume based on the available storage space in said file storage,
    requesting, via a wireless connection to the media file server, a transfer of new media files from the media file archive to the file storage,
    receiving new media files replacing the removed media files, and
    storing the received media files in the limited size media file storage.

A twenty-first embodiment of the present invention includes the features of the twentieth embodiment, wherein one type of wireless connection is a local wireless connection between the portable communication device and the media file archive and updating is automatically ordered in dependence of the existence of a local wireless connection.

A twenty-second embodiment of the present invention includes the features of the twenty-first embodiment, wherein the updating is automatically ordered if a number of media files have been played and a local wireless connection exists.

A twenty-third embodiment of the present invention includes the features of the twenty-first embodiment, wherein the updating is automatically ordered based on another further updating circumstance if a number of media files have been processed and no local wireless connection exists.

A twenty-fourth embodiment of the present invention includes the features of the twentieth embodiment, wherein one further updating circumstance is that a certain point in time has been reached.

A twenty-fifth embodiment of the present invention includes the features of the twenty-fourth embodiment, wherein the point in time is a relative point in time that depends on the latest previous update.

A twenty-sixth embodiment of the present invention includes the features of the twenty-fourth embodiment, wherein the point in time is a fixed point in time.

A twenty-seventh embodiment of the present invention includes the features of the twenty-fourth embodiment, wherein one further updating circumstance is that a calendar setting has been made in the portable communication device.

A twenty-eight embodiment of the present invention includes the features of the twentieth embodiment, wherein one further updating circumstance is that the portable communication device is physically connected to another device.

A twenty-ninth embodiment of the present invention includes the features of the twentieth embodiment, wherein a user of the portable communication device has a number of different selectable media profiles and said control unit is further arranged to select a media profile based on at least one of said further updating circumstances and provide information of the selected media profile to the media file server in order to enable reception of new media files according to said selected media profile, whereby said further updating circumstance used for selecting a media profile need not be used for determining automatic performing of updating.

A thirtieth embodiment of the present invention includes the features of the twentieth embodiment, wherein the media file storage includes at least one media file not present in the media file server, and the control unit is further arranged to remove at least one such media file not present in the media file server when removing processed media files and being further arranged to order the transfer of said removed media file to the media file server.

A thirty-first embodiment of the present invention includes the features of the thirtieth embodiment, wherein the selection of which such media files not present in the media file server that are removed and ordered for transfer is based on at least one further updating circumstance.

A thirty-second embodiment of the present invention includes the features of the twentieth embodiment, wherein the control unit is arranged to decide the updating volume also based on at least one further updating circumstance.

A thirty-third embodiment of the present invention includes the features of the twentieth embodiment, wherein the portable communication device is a cellular phone.

Another object of the present invention is to provide a media file server that provides an enhanced way of changing media files in a portable communication device for allowing a user to access a large amount of media files without having to be involved in the actual transfer.

According to a thirty-fourth embodiment of the present invention, this is achieved by a media file server comprising:
 a media file archive comprising a number of media files, and
 an archive control unit arranged to
  receive a request for transfer of new media files from a portable communication device via a wireless connection,
   where the portable communication device has sent the request in dependence of a first updating circumstance through detecting that a number of media files provided in a limited size media file storage of the portable communication device have been processed and at least one further updating circumstance based on determining the different types of wireless connections that can be set up between the portable communication device and the media file server possibly together with other further updating circumstances,
  select new media files in the media file archive that are to be fit into an updating volume specified by the portable communication device and that are to replace processed media files, and
  send these new files to the portable communication device for storing in the local storage.

A thirty-fifth embodiment of the present invention includes the features of the thirty-fourth embodiment, wherein the archive control unit is arranged to select media files according to a media profile in a set of media profiles associated with a user of the portable communication device that has been specified by the portable communication device.

A thirty-sixth embodiment of the present invention includes the features of the thirty-fourth embodiment, wherein the archive control unit is arranged to change coding of at least one new media file being transferred.

A thirty-seventh embodiment of the present invention includes the features of the thirty-sixth embodiment, wherein the coding is changed based on the quality of the wireless link between the portable device and the network.

A thirty-eight embodiment of the present invention includes the features of the thirty-sixth embodiment, wherein the coding is changed in order to fit the new files to the updating volume.

Another object of the present invention is to provide a system that provides an enhanced way of changing media files in a portable communication device for allowing a user to access a large amount of media files without having to be involved in the actual transfer.

According to a thirty-ninth embodiment of the present invention, this is achieved by a system for updating a portable communication device from a media file server and comprising:
 a portable communication device having
  at least one radio communication unit,
  a limited size media file storage
  a media processing unit arranged to process at least one media file in said file storage, and
  a control unit arranged to
   determine a first updating circumstance through detecting that a number of media files provided in the limited size media file storage have been processed,
   determine at least one further updating circumstance through determining the different types of wireless connections that can be set up between the portable communication device and the media file server, and
   automatically order updating, at least in dependence of said detecting a number of media files having been processed and the types of wireless connections that can be set up, possibly together with other further updating circumstances, through
    removing processed media files from the limited size file storage,
    determining an updating volume based on the available storage space in said file storage,
    requesting, via a wireless connection to the media file server, a transfer of new media files from the media file server to the file storage,
    receiving new media files replacing the removed media files, and
    storing of the received media files in the limited size media file storage, and
 a media file server having
  a media file archive comprising a number of media files, and
  an archive control unit arranged to
   receive the request for transfer of new media files from the portable communication device via said wireless connection,
   select the new media files in the media file archive that are to be fit into the updating volume, and
   send these new files to the portable communication device.

Another object of the present invention is to provide a computer program product that provides an enhanced way of changing media files in a portable communication device for allowing a user to access a large amount of media files without having to be involved in the actual transfer.

According to a fortieth embodiment of the present invention, this is achieved by a computer program product for updating a portable communication device from a media file server comprising:
 computer program code, to make the portable communication device execute, when said program code is loaded in the portable communication device,
  determine a first updating circumstance through detecting that a number of media files provided in the limited size media file storage have been processed,
  determine at least one further updating circumstance through determining the different types of wireless connections that can be set up between the portable communication device and the media file server, and
  automatically order updating, at least in dependence of said detecting a number of media files having been processed and the types of wireless connections that can be set up, possibly together with other further updating circumstances, through
   removing processed media files from the limited size file storage,
   determining an updating volume based on the available storage space in said file storage, requesting, via a wireless connection to the media file server, a transfer of new media files from the media file server to the file storage, receiving new media files replacing the removed media files, and storing of the received media files in the limited size media file storage.

According to a forty-first embodiment of the present invention, this is also achieved by a computer program product for updating a portable communication device from a media file server comprising:

computer program code, to make a media file server execute, when said program code is loaded in the media file server, receive a request for transfer of new media files from a portable communication device via a wireless connection, where the portable communication device has sent the request in dependence of a first updating circumstance through detecting that a number of media files provided in a limited size media file storage of the portable communication device have been processed and at least one further updating circumstance based on determining the different types of wireless connections that can be set up between the portable communication device and the media file server possibly together with other further updating circumstances, select new media files in a media file archive that are to be fit into an updating volume specified by the portable communication device and that are to replace processed media files, and send these new files to the portable communication device for storing in the local storage.

The invention has the following advantages. Old played files are replaced by new files in an automatic fashion without the user having to get involved. As long as files have been processed, updating may occur as soon as a user moves in the proximity of a media file server or some other updating circumstance exists. The user is therefore able to enjoy new media files and get the feeling that he has access to a whole archive without having to bother about how this is done. In this way it is furthermore ensured that the user does not tire of media files by having them too long in a portable communication device. In this way a user is allowed to focus on other things than how to transfer media files to the portable communication device.

BRIEF DESCRIPTION OF THE DRAWINGS

The present invention will now be described in more detail in relation to the enclosed drawings, in which.

DETAILED DESCRIPTION OF EMBODIMENTS

Figure 1:
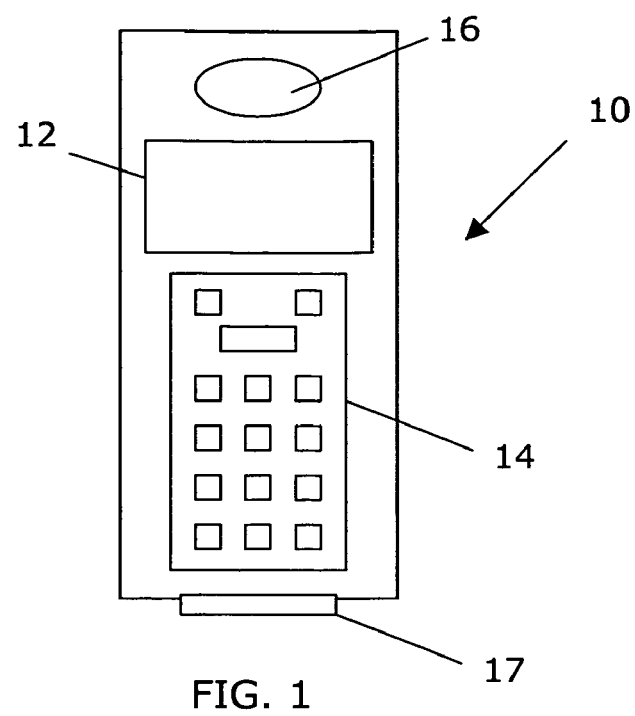
FIG. 1 shows a portable communication device in the form of a cellular phone.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one or more stated elements, steps and/or functions without precluding one or more unstated elements, steps and/or functions. The term "and/or" includes any and all combinations of one or more of the associated listed items. The common abbreviation "e.g.", which derives from the Latin phrase "exempli gratia," may be used to introduce or specify a general example or examples of a previously mentioned item, and is not intended to be limiting of such item.

It will also be understood that when an element is referred to as being "connected" to another element, it can be directly connected to the other element or intervening elements may be present. In contrast, when an element is referred to as being "directly connected" to another element, there are no intervening elements present. It will also be understood that the sizes and relative orientations of the illustrated elements are not shown to scale, and in some instances they have been exaggerated for purposes of explanation. Like numbers refer to like elements throughout.

Embodiments according to the present invention are described with reference to block diagrams and/or operational illustrations of methods, electronic apparatus, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

A portable communication device 10 according to some embodiments of the present invention is shown in FIG. 1. In some embodiments the device is a cellular phone 10 having a display 12, a user input unit in the form of a keypad 14 including a number of keys as well as a speaker 16. The phone 10 also has a system connector 17. Via the system connector 17 it is possible to connected the phone to external devices such as a charger and/or a hands-free set, where the hands-free set may be a separate entity or mounted in a car. The keypad 14 is used for entering information such as selecting of functions and responding to prompts and the display 12 is used for displaying functions and prompts to a user of the phone as well as for presenting video, while the speaker 16 is arranged to emit sound, like speech or music being played in the phone. A cellular phone is just one example of a device in which the invention can be implemented. Embodiments of the invention can for instance also be used in a PDA (personal digital assistant), a palm top computer, a lap top computer or a media player as long as the device has media processing functionality, like for instance being able to play or record media files, and it can become connected to a media file server via a wireless connection.

Figure 2:
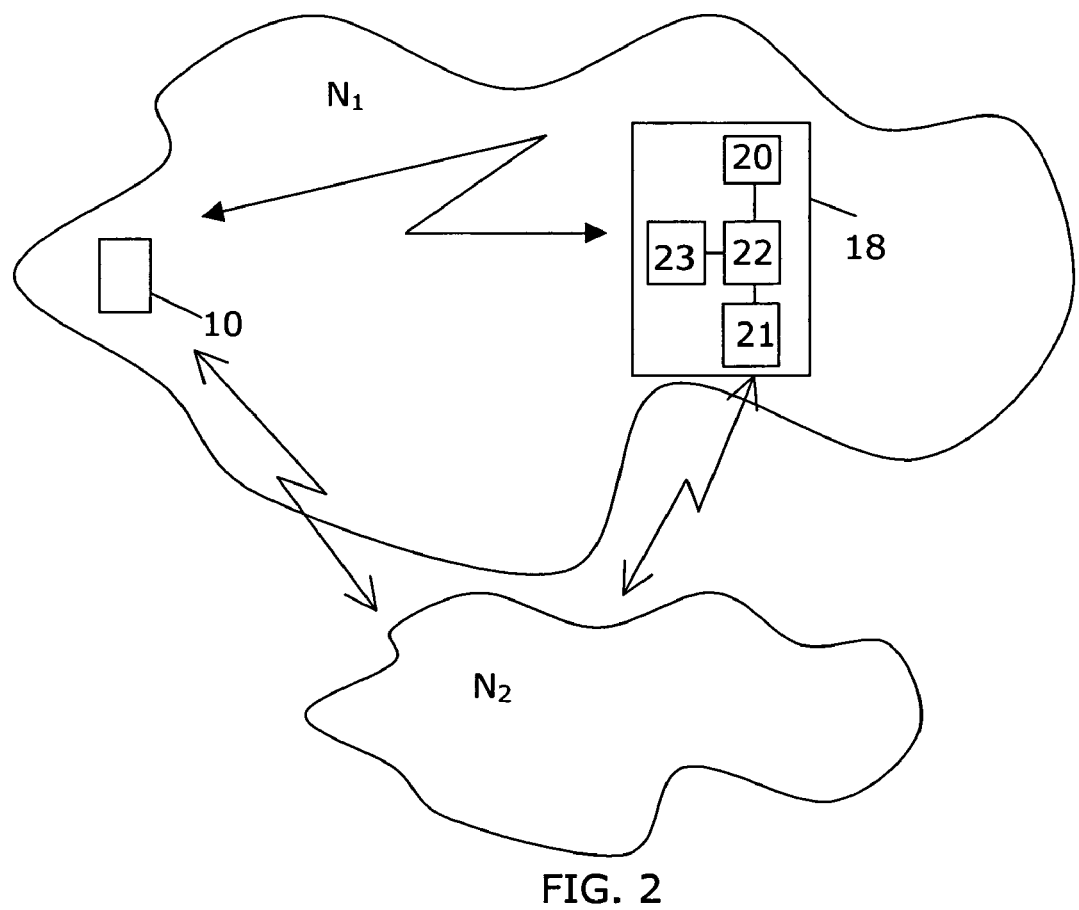
FIG. 2 schematically shows the phone in FIG. 1 connected to a media file server in a local network.

FIG. 2 shows the cellular phone 10 provided in a local wireless network $N_1$ and wirelessly communicating with a media file server 18 also provided in the local network $N_1$. The local network $N_1$ is preferably a home network and it can include such other things as one or more PCs, stereo equipment, TVs, video equipment etc. The local network $N_1$ is preferably a wireless LAN network, but other ways of providing local communication is possible, like for instance using Bluetooth™. The local network $N_1$ has a limited physical extension, which means that the cellular phone may for long periods of time be provided outside of the local network $N_1$. The media server 18 comprises a media file archive 20 comprising a number of media files, which may be music, for instance coded using MP3 and/or video files. The media server 18 furthermore comprises an archive control unit 22 as well as a first radio communication unit 21, a second radio communication unit in the form of a proximity communication unit 23, which may be a WLAN or Bluetooth™ communication unit.

Since the portable communication device is a cellular phone it is also able to communicate using one or more cellular networks, where one network $N_2$ is shown in FIG. 2. This network may be a GPRS network or a UMTS network. The invention is not limited to these types of networks though, but can be implemented in any wireless network allowing the transfer of media files. Also the media file server 18 is able to communicate via this network $N_2$ using the first communication unit 21. In this way the phone 10 has more than one route through which it may contact the server 18. The phone 10 may furthermore be able to download music and/or video from content providers via the network $N_2$. In FIG. 2 the second network $N_2$ is shown as covering another area than the area covered by the local network $N_1$. However, in reality the second network $N_2$ normally covers a very large area and normally also the area covered by the local network $N_1$.

Figure 3:
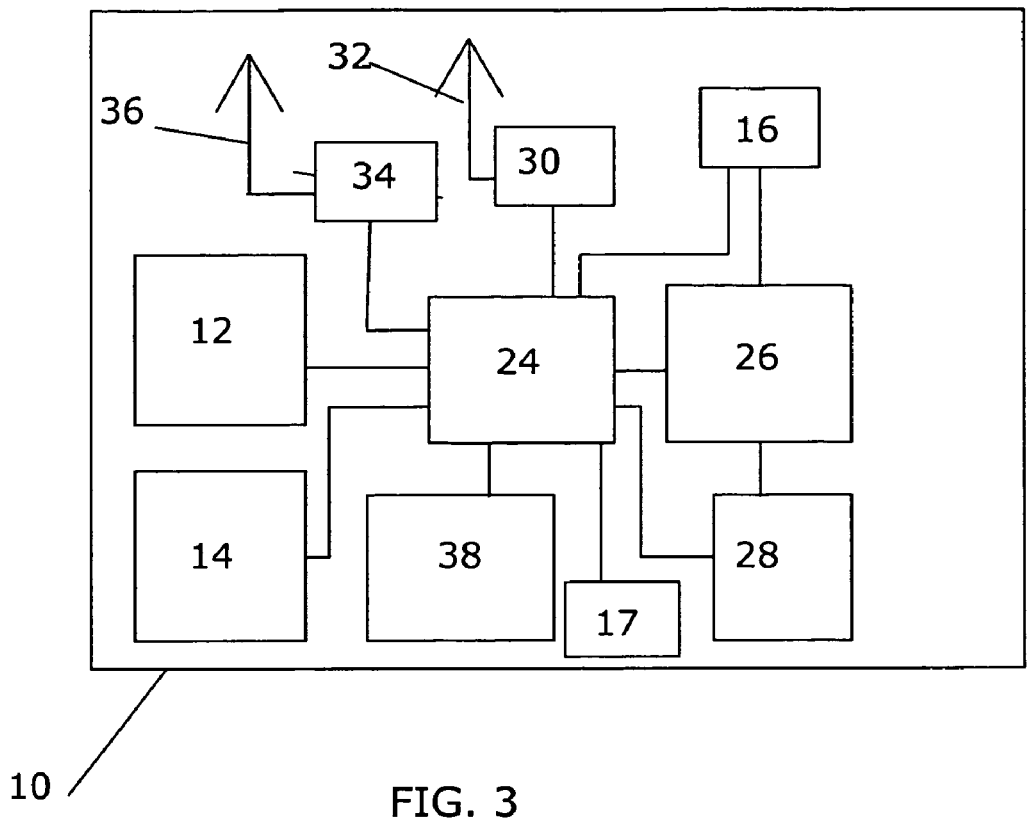
FIG. 3 shows a block schematic of components of the cellular phone according to some embodiments of the present invention.

FIG. 3 shows a part of the interior of the cellular phone 10 that is relevant for the present invention. The phone 10 includes a control unit 24 connected to a third radio communication unit 30 for communication in the cellular network, a fourth radio communication unit in the form of a proximity communication unit 34, which may thus be a WLAN or Bluetooth™ communication unit, a media processing unit 26, which in this embodiment is a media player, an application unit 38 running a certain application, like a calendar, a local media file storage 28, the speaker 16 and to the system connector 17. The third radio communication unit 30 is connected to a first antenna 32 for communication with the second network and the fourth communication unit 34 is connected to a second antenna 36 for communication with the local network. The media player 26 is connected to the speaker 16 as well as to the media file storage 28. It should here be realised that the media player 26 may also be connected to the display 12. As an alternative it is furthermore possible that several media processing units are provided, in order to handle media of different types provided in the phone 10, like for instance a camera and/or other media recording units as well as other media playing, editing and presenting units. Thus all types of units that can play, display, create, review or record media files can be used.

Figure 4:
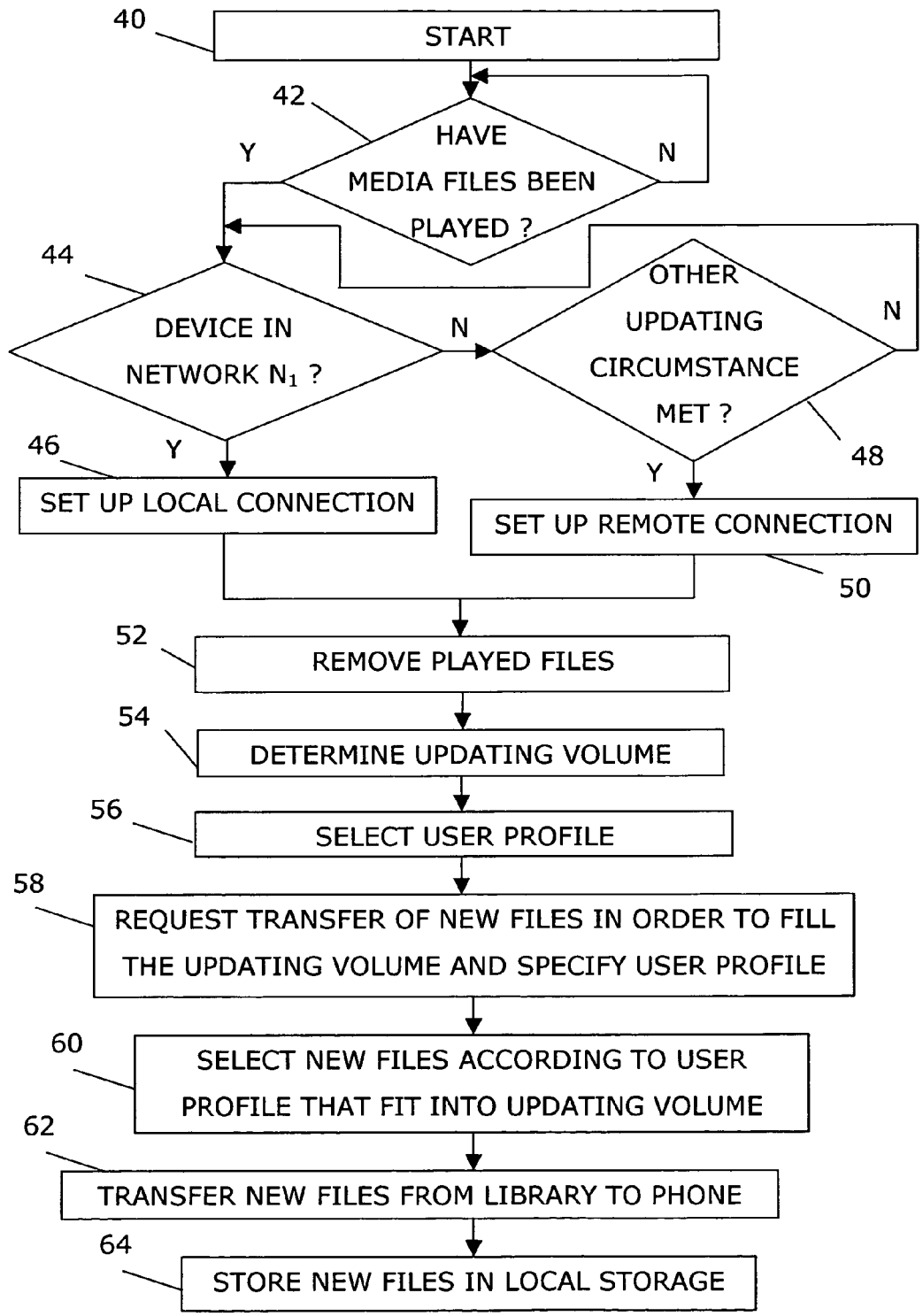
FIG. 4 shows a flow chart of methods according to some embodiments of the present invention for updating the portable communication device with new media files.

The functioning of various embodiments of the present invention will now be described in relation to the previously described FIG. 1-3 together with FIG. 4, which shows a flow chart of an embodiment of a method according to some embodiments of the present invention.

Some exemplary embodiments of the present invention will now be described in relation to a user, where media files are provided as music files, for instance MP3 coded files. It should however be realised that embodiments of the present invention can be used for other types of coding as well as other types of media files, like for instance video files, image files and MMS files.

A user has a media archive 20 provided in the server 18 in his home network $N_1$. There are provided several media files in the media archive 20. However the archive 20 is too large for all files therein to be provided simultaneously in the file storage 28 of the phone 10. For this reason a certain subset of the media archive 20 may be provided in the local storage 28. The media files downloaded to the phone 10 may furthermore fit a certain media profile, out of a number of media profiles that may exist for the user of the phone 10.

As the user is away from the home network $N_1$, he may process some of the media files in the local file storage 28, which in this embodiment is done through playing these media files, through activating the media player 26. Sound of a played media file may then be emitted through the speaker 16. For each file that the media player 26 has played, the player 26 then sets a flag indicating that the file in question has been played. The method of the present invention then starts at step 40, after which the control unit 24 checks if any files have been played, step 42, by looking at set flags. The playing of media files here make up a first updating circumstance. The control unit 24 may start checking that only one file has been played or that a certain number of files have been played, for instance five files. If there has not, the control unit 24 goes back and waits for the playing of files until the file playing criterion is fulfilled. If however there have been files played, step 42, the control unit 24 goes on and determines the types of network connections that exist, i.e. if the phone 10 is connected to the cellular network and/or the local network. This is done through the control unit 24 ordering the communication units 30 and 34 to check the networks they are connected to if any. They may also determine the communication quality. This information is then reported to the control unit 24. If the phone 10 is in the local network $N_1$ this makes up a further updating circumstance. If it is not in the local network $N_1$, step 44, the control unit 24 goes on and investigates if another further circumstance has been met, step 48. Another updating circumstance may in this embodiment be that the number of non-processed files, and in this embodiment the number of non-played files, in the local file storage 28 falls below a certain threshold, which is here set such that a limited number of non-played files remain in the local storage, This threshold may have any value, for instance between 1 and 10, and the number of three is here given as an example. Thus if three media files remain non-played, the updating circumstance is met. Further examples of other further updating circumstances will be given later. If this further updating circumstance is not met, step 48, the control unit 24 goes back and checks if the phone 10 is in the local network $N_1$, step 44. If however the further updating circumstance was met, step 48, the control unit 24 sets up a remote connection to the server 18 via the second network N$_2$, step 50, and then proceeds to step 52. If the device was located in the local network N$_1$ a local wireless connection is set up to the server inside the local network N$_1$, step 46. Thus if this local connection exists the control unit does not wait for this other further updating circumstance to be met.

Thereafter, irrespective of which network a connection is set up through, the control unit 24 removes he played files in the local storage 28, step 52, and then determines an updating volume, step 54. In this embodiment the updating volume is the same volume as was occupied by the removed files. Thereafter the control unit 24 selects a media profile, step 56. The media profile is here selected based on some updating circumstance that the device can determine. In this example the updating circumstance could be that the device 10 is in the local network N$_1$. The media profile can also be selected based on some other updating circumstance, like in dependence of a calendar setting. Further examples will be given later. The updating circumstance used for selecting a media profile may furthermore be different than the updating circumstance used for determining that an update is to be made.

Thereafter the control unit 24 sends a request for transfer of new files in order to fill the updating volume and also specifies the selected media profile, step 58. If the phone 10 is in the local network N$_1$, this is done through making the fourth radio communication unit 34 send this request on a local wireless connection via the second antenna 36. If the phone 10 was not in the local network N$_1$ the third radio communication unit 30 and first antenna 32 would have been used instead.

When the archive control unit 22 receives this request via corresponding radio communication unit 21 or 23 it selects new files from the archive 20 according to the media profile and that fit into the updating volume, step 60. It thus selects files that differ from the deleted played files and remaining non-played files in the local storage. It may here need to compress one or more of the files in order to fit them into the updating volume. It may also use different degrees of compression depending on the quality of the wireless connection, which network quality information may have been received from the phone control unit 24 or determined in the server 18. The compression can be decided in order to provide an optimal use of the updating volume and can then also be selected based on the media profile. It can here be used in order to provide adequate play time and quality, in order to maximize the play time or in order to maximize the playback quality. The media transport may make use of the best available connection between the archive 20 and the phone 10 or adapt the download rate and quality to the available data rate. When the archive control unit 22 has selected these files with a possible performed compression, they are transferred from the archive 20 to the phone 10 via the radio communication unit used 21 or 23, step 62. They are then received by the corresponding radio communication unit 30 or 34 in the phone 10 and forwarded to the control unit 24, which stores them in the local storage 28, step 64.

In this way the old played files have been replaced by new files in an automatic fashion without the user having to get involved. As long as files have been played, updating then occurs as soon as the user moves into the local network. The user is therefore able to listen to new music and get the feeling that he has access to the whole archive without having to bother about how this is done. In this way it is furthermore ensured that the user does not tire of media files by having them too long in the phone. In this way a user is allowed to focus on other things than how to transfer media files to the phone. By providing a media profile the user may furthermore receive files that he is interested in depending on the situation he is in.

In the example given above two further updating circumstances were mentioned. It is possible to use several other updating circumstances, where a few will be mentioned now. It is possible that the phone keeps track of when the last update was made and it will then make an update if a certain time has lapsed since the last update. It may also perform an update at a fixed time, such as for instance on Friday afternoon at six o'clock. This may be the case when the media profile indicates that the user would like to listen to new music during the weekend. It is also possible that a further updating circumstance is based on the portable communication device being connected to another device via the system connector 17, like for instance to a charger or a hands-free set, for instance provided in a car, which may be a situation where a user would like to listen to new music. One further updating circumstance used may be based on a certain setting in the calendar or, as mentioned before, that there are only a few non-played files remaining in the local storage.

A user may, as was mentioned before, have a number of media profiles, which means that he might be interested in certain types of music in different situations, for instance one type of music when being at home, another type when being out jogging, yet another type when sitting in a car etc. By allowing the portable communication device to select different media profiles automatically the user is ensured to be provided with files according to his liking without having to do anything further. These media profiles may be selected based on the same further updating circumstances described above for determining that an update is to be made. If for instance the phone is located in the local network, one media profile may be selected. If the phone is connected to a hands-free device or a charger another may be selected, if the time of date is on a Friday afternoon another profile may be selected. If a calendar setting has been made, such as out jogging, another profile may be selected etc. For each media profile it is possible to select types of files that are to be transferred to the phone from the server and also select files that are to be removed from the file storage. It is thus for instance possible to remove video files and receive music files instead, to remove music files of one type and receive music files of another type, where a type can be a type of music like classical music and another type disco music etc. In this way the available media storage is used optimally. A short video clip may for instance be automatically replaced by audio files, occupying the same amount of storage but with a longer play time, if the media profile indicates that playtime is preferred. It is furthermore possible to let the server select individual files that fit to a certain media profile based on preference scores that are either supplied by the user or determined based on user actions and play sequences. This can be done according to the principle described in US2005/0021470, which is herein incorporated by reference.

Cellular phones of today normally have the capacity to record their own video or download content from a content provider. The phone may therefore have files stored in it that do not exist in the archive in the local network. Some embodiments of the present invention may therefore allow uploading of files that exist in the local storage to the archive at the time updating is made. Such uploading may furthermore be done such that these files are uploaded and then removed even if they have not been played. As an alternative they may be played and then uploaded before being deleted. However they should have been processed, which processing may include the generation of the file question and presenting of the file.

This may for instance be the case if the user has shot a certain piece of video, which he wants to keep at home for watching on his television set. If the user takes this freedom to record unique media files with the device, these files also take part in the enhanced media changing system. Unique files are uploaded to the media archive and kept for future enjoyment while being replaced with new fresh files.

According to another embodiment of the present invention the updating volume is not necessarily the same volume as that being deleted. It may be larger if the local storage allows it or be smaller. This latter situation may for instance arise for a certain point in time, like for instance on Friday afternoon or for a calendar setting, like for instance a setting indicating a weekend trip. In this way it is possible to reserve space for a user to download or record own media files. The updating volume might be determined directly by an updating circumstance or indirectly based on a media profile that has been selected based on an updating circumstance. Determining an updating volume based on usage, sometimes leave a greater deal of free space for user consumption.

The control unit, media processing unit and application unit in the phone according to some embodiments of the present invention may be provided in the form of one or more processors with corresponding memory containing the program code for performing the functions of these units, whereas the local storage is provided as a memory module or a part of as memory module, which may be a RAM, ROM, a flash memory or a memory stick. Normally the radio communication units are provided as separate hardware modules, for instance in the form of ASIC circuits. They may however be combined in the same module. The different hardware units of the phone may furthermore be connected using a data bus.

In the server, the archive control unit may likewise be implemented as a processor with corresponding memory comprising program code for performing the functions if the archive control unit. The archive may be provided as one or memory modules, for instance in form of hard discs and may furthermore be distributed throughout the local network. The radio communication units may here also be provided in the form of ASIC circuits.

Figure 5:
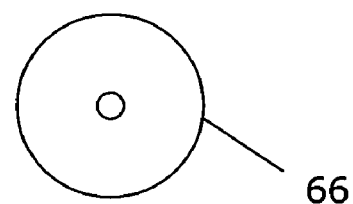
FIG. 5 shows a CD ROM disc on which program code for executing a methods and computer program products according to some embodiments of the present invention.

The program code mentioned above can also be provided on one or more computer program products such as a CD ROM disc 66 as depicted in FIG. 5, which will perform the invention when loaded into a phone having suitable processing capabilities or when loaded into the server. Naturally other types of products can be provided for this, like for instance a removable memory like a memory stick. The computer program product can also be provided as software, which is downloaded remotely from a server either outside or inside the cellular network or be downloaded via a computer like a PC to which the phone is temporarily connected.

There are a number of further variations that can be made to embodiments of the present invention in addition to those already mentioned. For example, the server may not be provided in a local network. It is thus also possible that the phone communicates directly with the server. It is furthermore possible that the invention does not use any determination of media profiles, but only selects new media files. The process of requesting updating and selecting of profiles can furthermore be made separately for different types of files, like for instance for music files and video files. It is also possible that if an updating is made for one such type, there is provided an updating also of the other type, despite the fact that no updating should be made for the other type. The radio communication units of the local network may be provided in each device, such as in the server, but the server may just as well have a link to a radio communication unit provided in the local network.

Although the present invention has been described in connection with specific embodiments, it is not intended to be limited to the specific form set forth herein. Rather, the scope of the present invention is limited only by the accompanying claims.

What is claimed is:

1. Method of updating a portable communication device from a media file server, the method comprising the steps of:
maintaining a plurality of situation dependent media profiles in the portable communication device, wherein at least two of the situation dependent media profiles are associated with different lists of media files;
determining a first updating circumstance that includes selecting among the situation dependent media profiles in response to at least one predefined rule; and
automatically performing, in response to change from a previously selected situation dependent media profile to a newly selected situation dependent media profile, updating media files in the portable communication device via a network connection, through the steps of:
removing at least one media file that is within the list of the previously selected situation dependent media profile and which is not within the list of the newly selected situation dependent media profile from a limited size file storage of the portable communication device;
determining the available storage space for media files in the file storage after the step of removing;
determining an updating volume based on said available storage space;
requesting, via a wireless connection to a media file server, a transfer of new media files, which are within the list of the newly selected situation dependent media profile, from the media file server to the file storage to be fit into the updating volume;
receiving new media files through the wireless connection replacing at least some removed media files; and
storing the received media files in the media file storage.

2. Method according to claim 1, wherein selection among the situation dependent media profiles is further carried out in response to when a number of non-processed media files within a list of the previously selected situation dependent media profile and which are in the media file storage falls below a threshold.

3. Method according to claim 1, wherein selection among the situation dependent media profiles is further carried out in response to when a point in time is reached that is defined relative to the latest previous update.

4. Method according to claim 1, wherein selection among the situation dependent media profiles is further carried out in response to the portable communication device being physically connected to another device.

5. Method according to claim 1, further comprising the step of selecting new media files in the media file server that are within the list of the newly selected situation dependent media profile and which are not within the list of the previously selected situation dependent media profile and which are to be fit into the updating volume and sending these files to the portable communication device.

6. Method according to claim 5, further comprising the step of changing coding of at least one new media file in response to selection of the new situation dependent media profile.

7. Method according to claim 6, wherein the coding is changed in order to fit the new media files to the determined updating volume.

8. Method according to claim 1, wherein the updating volume is determined in response to selection of the new situation dependent media profile.

9. Method according to claim 1, wherein the step of determining comprises:
selecting a first one of the situation dependent media profiles in response to a local wireless connection existing between the portable communication device and the media file server; and
selecting a second one of the situation dependent media profiles, which is different from the first situation dependent media profile, in response to a wireless wide area network connection existing between the portable communication device and the media file server.

10. Method according to claim 1, wherein the step of determining comprises:
selecting between using a first one of the situation dependent media profiles and a different second one of the situation dependent media profiles in response to a time of day.

11. Method according to claim 1, wherein the step of determining comprises:
selecting between using a first one of the situation dependent media profiles and a different second one of the situation dependent media profiles in response to a calendar setting.

12. Method according to claim 1, wherein the step of determining comprises:
selecting a first one of the situation dependent media profiles in response to the portable communication device being connected to a hands-free communication device; and
selecting a second one of the situation dependent media profiles, which is different from the first situation dependent media profile, in response to the portable communication device not being connected to a hands-free communication device.

13. A portable communication device comprising:
at least one radio communication unit;
a limited size media file storage;
a media processing unit arranged to process at least one media file in the media file storage; and
a control unit that is configured to:
maintain a plurality of situation dependent media profiles, wherein at least two of the situation dependent media profiles are associated with different lists of media files in the media file storage;
determine a first updating circumstance that includes selecting among the situation dependent media profiles in response to at least one predefined rule; and
automatically perform, in response to change from a previously selected situation dependent media profile to a newly selected situation dependent media profile, updating media files in the portable communication device via a network connection, by:
removing at least one media file that is within the list of the previously selected situation dependent media profile and which is not within the list of the newly selected situation dependent media profile from the media file storage,
determining an updating volume based on the available storage space in the media file storage after removal of the at least one media file,
requesting, via a wireless connection to a media file server, a transfer of new media files from the media file archive to the media file storage,
receiving new media files replacing the removed media files, and storing the received media files in the media file storage.

14. Portable communication device according to claim 13, wherein the control unit is further configured to select among the situation dependent media profiles in response to when a number of non-processed media files within a list of the previously selected situation dependent media profile and which are in the media file storage falls below a threshold.

15. Portable communication device according to claim 13, wherein the control unit is further configured to select among the situation dependent media profiles in response to when a point in time is reached that is defined relative to the latest previous update.

16. Portable communication device according to claim 13, wherein the control unit is further configured to select among the situation dependent media profiles in response to the portable communication device being physically connected to another device.

17. Portable communication device according to claim 13, wherein the control unit is arranged to decide the updating volume in response to selection of the new situation dependent media profile.

18. Portable communication device according to claim 13, wherein the portable communication device is a cellular phone.

19. The portable communication device of claim 13, wherein the control unit is further configured to:
select a first one of the situation dependent media profiles in response to a local wireless connection existing between the portable communication device and the media file server; and
select a second one of the situation dependent media profiles, which is different from the first situation dependent media profile, in response to a wireless wide area network connection existing between the portable communication device and the media file server.

20. The portable communication device of claim 13, wherein the control unit is further configured to:
select between using a first one of the situation dependent media profiles and a different second one of the situation dependent media profiles in response to a time of day.

21. The portable communication device of claim 13, wherein the control unit is further configured to:
select between using a first one of the situation dependent media profiles and a different second one of the situation dependent media profiles in response to a calendar setting.

22. The portable communication device of claim 13, wherein the control unit is further configured to:
select a first one of the situation dependent media profiles in response to the portable communication device being connected to a hands-free communication device; and
select a second one of the situation dependent media profiles, which is different from the first situation dependent media profile, in response to the portable communication device not being connected to a hands-free communication device.

23. A media file server comprising:
a memory containing a media file archive including a number of media files; and
an archive control unit, implemented as a processor with corresponding memory, that is configured to:
maintain a plurality of situation dependent media profiles, wherein at least two of the situation dependent media profiles are associated with different lists of media files in the media file archive;

receive a request for transfer of new media files that correspond to one of the situation dependent media profiles that is selected in response to at least one predefined rule; and automatically perform, in response to change from a previously selected situation dependent media profile to a newly selected situation dependent media profile, selection of at least one new media file in the media file archive that is within the list of the previously selected situation dependent media profile and which is not within the list of the newly selected situation dependent media profile, and to send the selected at least one new media file and to a portable communication device for storing in local storage therein.

24. Media file server according to claim 23, wherein the archive control unit is arranged to change coding of at least one new media file being transferred in response to selection of the new situation dependent media profile.

25. Media file server according to claim 24, wherein the coding is changed in order to fit the new media files to an updating volume specified by the portable communication device.

26. The media file server of claim 23, wherein the archive control unit is further configured to:
select a first one of the situation dependent media profiles in response to a local wireless connection existing between the portable communication device and the media file server; and
select a second one of the situation dependent media profiles, which is different from the first situation dependent media profile, in response to a wireless wide area network connection existing between the portable communication device and the media file server.

27. The portable communication device of claim 23, wherein the archive control unit is further configured to:
select between using a first one of the situation dependent media profiles and a different second one of the situation dependent media profiles in response to a time of day.

28. The portable communication device of claim 23, wherein the archive control unit is further configured to:
select between using a first one of the situation dependent media profiles and a different second one of the situation dependent media profiles in response to a calendar setting.

29. The portable communication device of claim 23, wherein the archive control unit is further configured to:
select a first one of the situation dependent media profiles in response to the portable communication device being connected to a hands-free communication device; and
select a second one of the situation dependent media profiles, which is different from the first situation dependent media profile, in response to the portable communication device not being connected to a hands-free communication device.

30. A computer program product stored on a computer readable system device including codes that is configured to update a portable communication device from a media file server, the computer program product, when executed by the portable communication device, is configured to:
maintain a plurality of situation dependent media profiles, wherein at least two of the situation dependent media profiles are associated with different lists of media files in the media file storage;
determine a first updating circumstance that includes selecting among the situation dependent media profiles in response to at least one predefined rule; and
automatically perform, in response to change from a previously selected situation dependent media profile to a newly selected situation dependent media profile, updating media files in the portable communication device via a network connection, by:
removing at least one media file that is within the list of the previously selected situation dependent media profile and which is not within the list of the newly selected situation dependent media profile from the media file storage,
determining an updating volume based on the available storage space in the media file storage after removal of the at least one media file,
requesting, via a wireless connection to the media file server, a transfer of new media files from the media file server to the media file storage,
receiving new media files replacing the removed media files, and
storing of the received media files in the media file storage.

31. The computer program product of claim 30, wherein the computer program code is further configured to:
select a first one of the situation dependent media profiles in response to a local wireless connection existing between the portable communication device and the media file server; and
select a second one of the situation dependent media profiles, which is different from the first situation dependent media profile, in response to a wireless wide area network connection existing between the portable communication device and the media file server.

32. The computer program product of claim 30, wherein the computer program code is further configured to:
select between using a first one of the situation dependent media profiles and a different second one of the situation dependent media profiles in response to a time of day.

33. The computer program product of claim 30, wherein the computer program code is further configured to:
select between using a first one of the situation dependent media profiles and a different second one of the situation dependent media profiles in response to a calendar setting.

34. The computer program product of claim 30, wherein the computer program code is further configured to:
select a first one of the situation dependent media profiles in response to the portable communication device being connected to a hands-free communication device; and
select a second one of the situation dependent media profiles, which is different from the first situation dependent media profile, in response to the portable communication device not being connected to a hands-free communication device.

35. A computer program product stored on a computer readable system device including codes that is configured to update a portable communication device from a media file server, the computer program product, when executed by the media file server, is configured to:
maintain a plurality of situation dependent media profiles, wherein at least two of the situation dependent media profiles are associated with different lists of media files in the media file archive;
receive a request for transfer of new media files that correspond to one of the situation dependent media profiles that is selected in response to at least one predefined rule; and
automatically perform, in response to change from a previously selected situation dependent media profile to a newly selected situation dependent media profile, selection of at least one new media file in the media file archive that is within the list of the previously selected situation dependent media profile and which is not within the list of the newly selected situation dependent media profile, and to send the selected at least one new media file to the portable communication device for storing in local storage therein.

* * * * *